Figure 1:
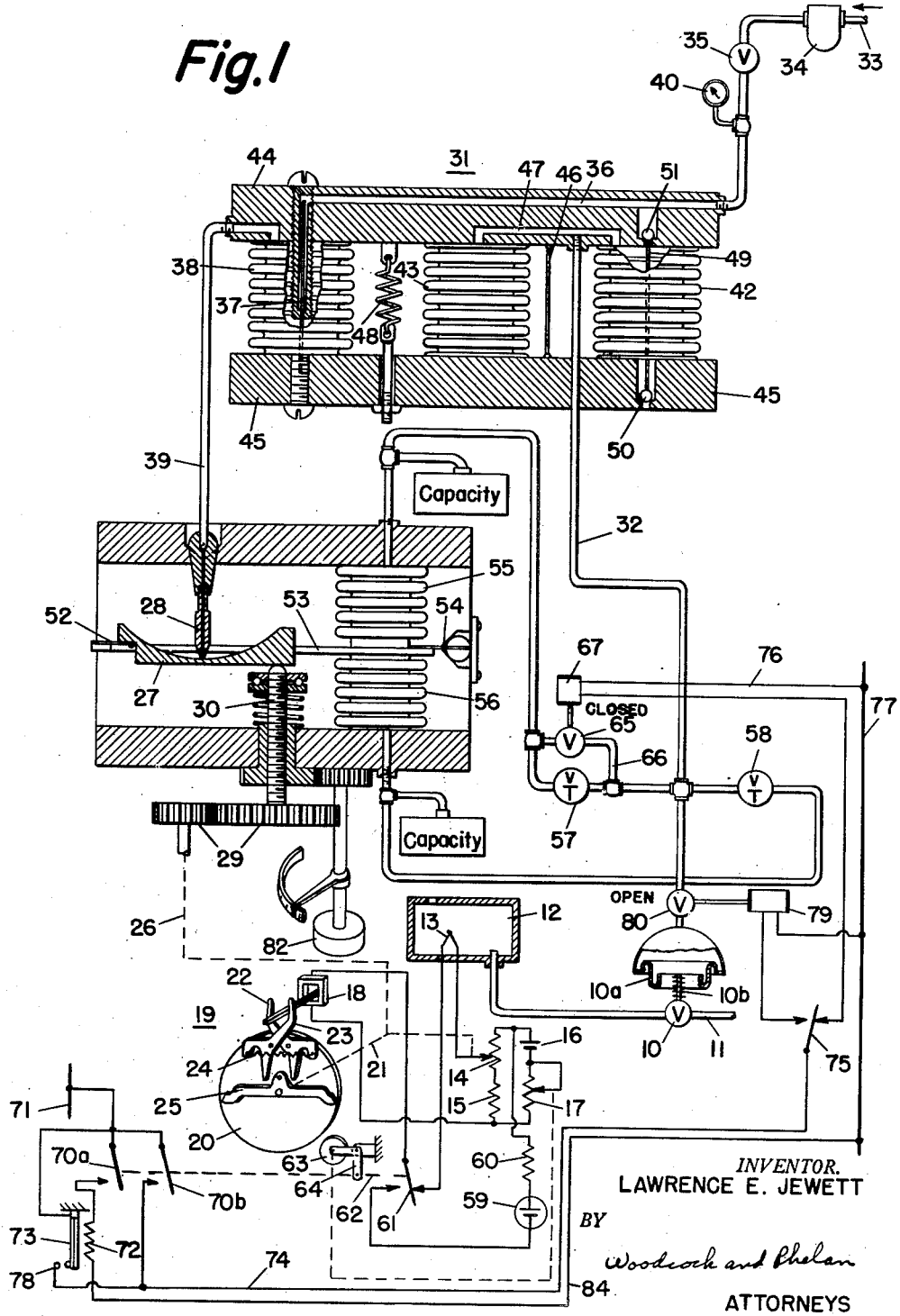

Sept. 7, 1954

L. E. JEWETT 2,688,334

CONTROL SYSTEM WITH RATE-ACTION

Filed July 30, 1951

2 Sheets-Sheet 1

INVENTOR.
LAWRENCE E. JEWETT

BY
Woodcock and Phelan

ATTORNEYS

INVENTOR.
LAWRENCE E. JEWETT
BY
Woodcock and Phelan
ATTORNEYS

Patented Sept. 7, 1954

2,688,334

UNITED STATES PATENT OFFICE 2,688,334

CONTROL SYSTEM WITH RATE-ACTION

Lawrence E. Jewett, Springfield, Pa., assignor to Leeds and Northrup Company, Philadelphia, Pa., a corporation of Pennsylvania Application July 30, 1951, Serial No. 239,250

7 Claims. (Cl. 137—86)

This invention relates to control systems of the type used for the regulation of the magnitude of a controlled or measured variable, quantity, or condition, such as temperature, pH values, rate of flow, or other physical, chemical or electrical condition, and has for an object the provision of means for eliminating rate action as a factor in the adjustment of the final control element notwithstanding an abrupt change in balance of a balanceable network as during the standardization thereof.

In maintaining the magnitude of the controlled variable at a predetermined value, as at the control point, control systems regulate the position of the final control element in accordance with the sum of several control actions which minimize excursions of the controlled variable from the control point. One such action is known as proportioning control which means that the positioning of the valve or the movement of the final control element is in predetermined ratio with respect to the deviation of the controlled variable from the control point. Another factor of control action is automatic reset. Automatic reset or droop correction means that the change in position of the final control element will be at a speed proportional to the extent of the deviation of the controlled variable from the control point. A third component is referred to as rate action which means that the position of the final control element will also depend upon the rate of change of the controlled variable. While other control actions may be included, those referred to above are the principal ones ordinarily incorporated in control systems. They can be provided either by electrical or pneumatic means. In either case, when rate action is employed an abrupt change in the position of the measuring element of the system will produce a temporary change in position of the final control element of great magnitude. Such abrupt changes can and do occur in electrical measuring systems of the potentiometer type where the voltage of the current source has drifted from its correct value and is rapidly restored to that correct value by a standardizing operation. However, during standardizing an abrupt change in position of the balanceable element, such as a potentiometer slidewire, results in large changes in the final control element, such as a control valve, which may tend to cause the control system to oscillate and hunt and otherwise to introduce instability in an operation intended to hold the controlled variable at the control point. Secondary effects may be of equal or greater importance.

For example, in furnaces in which oil or gas is used for generation of heat, it has in practice been observed that when the battery supplying the potentiometer circuit has drifted from its predetermined value and, hence, has resulted in the application of a substantial unbalance signal during standardization, the fuel-controlling valve has been rapidly operated to closed position followed by rapid operation to fully open position. While such an operation is undesirable from the standpoint of temperature control, it is intolerable in the operation of a furnace. When the fuel valve closes the fires may be extinguished. When the fuel valve is moved to open position there is danger, and it has occurred, of positive pressure within the fire box causing tongues of flame to issue through any openings around the furnace. Avoidance of such conditions is highly desirable in any control in which plant personnel will have confidence.

Secondary results of abrupt and large changes in the position of the final control element apply to many processes in which there is sudden and wide change in the condition-varying agent, whether it be flow of fuel to a furnace, hot fluid to heat exchanges, or other similar processes.

It is to be understood that any abrupt change in balance of the balanceable network or any abrupt change in a system including rate action will likewise bring about abrupt and large changes in the position of the final control element. More particularly, in a temperature control system, if a furnace door is suddenly opened to permit ingress of a substantial quantity of cool air the sudden temperature change may introduce an abruptly changing unbalance signal approaching that which has been described as incident to a standardizing operation. It is an object of the present invention to avoid the effects of rate action whenever it is anticipated abrupt changes may occur not due to change in the magnitude of the measured variable for which rate action compensation may be desired.

In carrying out the present invention in one form thereof, there is provided means for eliminating the rate action as a factor in the adjustment of the final control element notwithstanding any abrupt change in the position of one of the balance-producing elements, as for example, the main slidewire, during standardizing.

Figure 2:
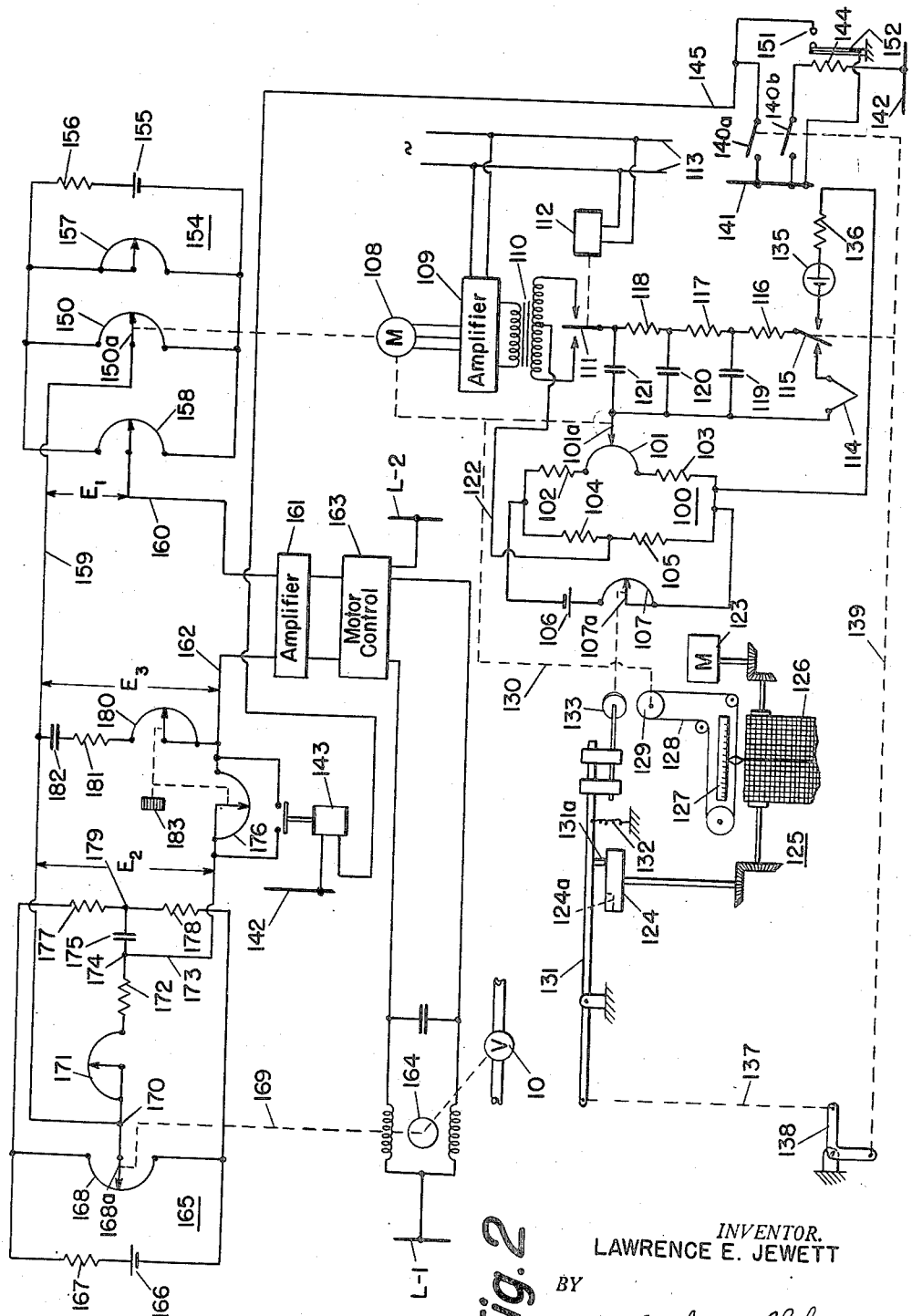

For further objects and advantages of the invention, reference is to be had to the following description, taken in conjunction with the accompanying drawings, in which:

Fig. 1 diagrammatically illustrates the present invention as applied to an electropneumatic control system; and Fig. 2 diagrammatically illustrates the present invention as applied to an electrical control system.

Referring to the drawings and particularly to Fig. 1, the final control element is shown as a valve 10 positioned by variation of fluid pressure applied to a diaphragm 10a to move it against the force of an opposing spring 10b. The valve 10 is illustrated as regulating the flow of fuel in a fuel supply line 11 to a furnace 12 whose temperature is to be maintained at a predetermined value, the control point. A thermocouple 13 is subjected to the temperature of the furnace 12 and upon deviation in that temperature unbalances a balanceable network including a main slidewire 14, a resistor 15, a battery 16, and a rheostat 17. Unbalance of the balanceable network produces deflection of a galvanometer 18 of a mechanical relay 19 which, through a disc 20 and a driving connection indicated by the broken line 21, restores balance to the network by adjustment of the slidewire 14.

The mechanical relay 19 may be of the type disclosed in Squibb Patent No. 1,935,732 in which a pair of feeler members 22 and 23 under the influence of a spring 24 position a clutch member 25 relative to the clutch disc 20. Suitable cams, not shown in the schematic view of Fig. 1, control the movement of the clutch member 25 into and out of engagement with the disc 20, and in restoring the member 25 to its illustrated position produce relative movement between the slidewire and its adjustable contact to rebalance the system in a manner already described.

Each time there is adjustment of the main slidewire 14 through the mechanical connection 26, a baffle 27 is adjusted relative to the end of a nozzle 28. That adjustment is produced by rotation of gears 29 and a threaded control screw 30 which raises and lowers the right-hand end of baffle 27 to regulate the outward flow of fluid, such as air, through nozzle 28.

The operation of the pneumtaic control system thus far described and that part of it immediately following is more fully described in Patent No. 2,543,120, McLeod, Jr., et al., and in Patent No. 2,507,606, McLeod, Jr.

In brief, change in air flow in the nozzle 28 under the control of baffle 27 operates a booster 31 to change the air pressure in a line 32 leading to the upper side of the diaphragm 10a. Air flows both to the booster and to the nozzle 28 from any suitable source of supply, such as indicated by a supply line 33 by way of a filter 34, a pressure-regulating valve 35, a passageway 36, and a restriction 37 within a bellows 38 of the booster 31. A pipe 39 leading from the nozzle 28 is in communication with the interior of bellows 38. The air pressure within passageway 36 is indicated on a pressure gauge 40. The booster 31 also includes bellows 42 and 43. All three bellows are mounted between a stationary base which may be taken as the upper heavy member 44 and a movable plate 45 pivotally supported from the base member as by a flexible hinge or leaf spring 46. The bellows 42 and 43 of substantially the same effective area are mounted on opposite sides of the flexible hinge 46, the bellows 42 being at a somewhat greater distance from the hinge 46 than bellows 43. A passageway 47 interconnects the respective interiors of bellows 42 and 43, and it is also connected to the line 32 leading to the diaphragm-actuated valve 10. The bellows 43 decreases the effective moment of bellows 42 so that a desired ratio of pressure changes in bellows 38 with respect to the pressure changes in bellows 42 can be obtained with bellows and lever arms of practical dimensions or magnitude. An adjustable spring 48 extends between the stationary base 44 and the movable plate 45 and, as shown, opposes the action of bellows 38 and 43.

It will be observed that the bellows 42 includes a valve actuator 49. As shown, a lower valve 50 as well as an upper valve 51 are closed. However, when the plate 45 is rotated, as for example in a counterclockwise direction, as by an increase in pressure in bellows 38, it opens the valve 51. Air is thus admitted from passageway 36 into bellows 42, the increase in pressure also being applied by way of pipe 32 to the diaphragm 10a of valve 10. When the pressure in bellows 38 decreases, plate 45 moves in a clockwise direction opening the valve 50 to decrease the pressure in bellows 42 and that applied to the diaphragm 10a operating valve 10. In one embodiment of the invention, a one-pound change of pressure applied to the bellows 38 required a ten-pound change in the common pressure applied to bellows 42 and 43 to balance it. In this connection, it is to be noted the ratio, of the order of ten to one, is independent of the tension on the spring 48 which is utilized to preselect the magnitude of the output pressure on the diaphragm 10a for a particular setting of the baffle 27 relative to the nozzle 28.

The baffle 27 is pivotally secured as by a spring 52 to an arm 53 pivoted by a spring 54 to the frame. Disposed respectively on opposite sides of arm 53 are bellows 55 and 56. The bellows 55 is flow-connected to the line 32 by way of a throttling valve 57 and acts in a direction to oppose the motion of the baffle 27 produced by motion of the control screw 30. The bellows 56 is flow-connected through a throttling valve 58 to the line 32 and serves to provide reset action for the control system. The throttling valve 57 introduces a rate control action.

The operation as a whole will be readily understood by assuming that the temperature of furnace 12 has dropped slightly. The voltage of thermocouple 13 decreases, the unbalance voltage of the balanceable network causes the galvanometer 18 to deflect, and the mechanical relay 19 readjusts the slidewire 14 to rebalance the system, and at the same time through mechanical connection 26, gearing 29 and control screw 30 changes the position of baffle 27 relative to nozzle 28. That changed position increases the pressure within bellows 38 with resultant counterclockwise rotation of plate 45 to increase the pressure in line 32. With valve 57 fully open, the increased pressure in line 32 is immediately applied to bellows 55 which, by moving the left-hand end of baffle 27 in a direction opposite to the motion produced by control screw 30, causes the pressure change in line 32 to be proportional to the movement of control screw 30. The increase in pressure proportional to the extent of change of temperature is applied to the diaphragm 10a to open the valve 10 for introduction of additional fuel to the furnace 12.

It is to be observed that the increased pressure in line 32 is applied by way of throttling valve 58 to the bellows 56 which assists or acts in the same direction on the baffle 27 as the described adjustment of control screw 30. The increase in pressure in line 32 produces a differential pressure across valve 58 causing a flow of air through valve 58 to bellows 56 to move baffle 27 toward nozzle 28. This action further increases the pressure in line 32 to further open valve 10 to increase the flow of fuel to furnace 12. The increase in fuel flow raises the temperature of furnace 12 and through gearing 29 adjusts baffle 27 in a direction to decrease the pressure differential across valve 58. When the temperature in the furnace 12 has been returned to the control point, the pressure differential across valve 58 will have been reduced to zero and the system will then be in a state of equilibrium with a higher pressure in line 32 than existed prior to the temperature deviation. This action corrects for droop and is generally referred to as reset action.

It is to be further observed the change in pressure in line 32 is applied by way of throttling valve 57 to the bellows 55 which acts on baffle 27 in a direction opposite to that produced by the control screw 30. From one viewpoint, the bellows 55 tends to introduce negative feedback into the operation of the system. By introducing a flow restriction, as by the valve 57, into the line leading to bellows 55, the negative feedback action is delayed. The smaller the opening of valve 57, the greater will be the delay in transmittal of the pressure through flow restriction of valve 57 to the bellows 55. The delay of negative feedback produces an additional pressure change in line 32 proportional to the rate of change of the controlled variable. Thus, an augmented control action results to produce an adjustment of valve 10 related to the rate of change of the controlled variable as exemplified by the temperature of thermocouple 13.

The throttling valve 58, by means of which reset action can be regulated, is in general adjusted to introduce greater impedance to air flow than the restriction formed by valve 57.

In Patent No. 2,543,120, there is emphasized the instability introduced into the control system by the rate action, and pursuant to that patent means were provided to prevent instability of the system due to transient changes of pressure in line 32.

In accordance with the present invention, there have been eliminated further causes of unstable operation resulting from the need periodically to standardize the balanceable network due to change in the voltage of the source of supply or battery 16. The standardizing circuit itself, including a standard cell 59 and a series resistor 60, is more or less conventional. As already described, the thermocouple 13 is illustrated as connected to galvanometer 18. By means of a transfer switch 61 the standardizing circuit is connected to the galvanometer, and through mechanical connections indicated by the broken line 62 a driving disc 63 is rotated by a crank arm 64 into engagement with the disc 20 of the mechanical relay 19. The disc 63 driven by disc 20 drives or adjusts the rheostat 17 in series with battery 16 in the potentiometer circuit.

If the voltage of battery 16 has departed from its previous value (it will generally be lower), then upon operation of the transfer switch 61 it will be seen that there will be applied to the galvanometer 18 the difference between the voltage produced by battery 16 across the potentiometer and that of standard cell 59. If the difference be substantial, there will be substantial deflection of galvanometer 18. The effect is the same as though there were applied a "step function" to galvanometer 18, that is, a large change of voltage occurring in zero time, or a change at maximum rate. Mechanical relay 19 thereupon produces a correspondingly great change in position of the control screw 30 with a corresponding large change in pressure in the line 32. Since the rate of change of voltage applied to galvanometer 18 is a maximum, the rate of pressure change in line 32 will be a maximum. Hence, the effect of the rate action introduced by restriction 57 will be a maximum, and the control valve 10 will be moved a large amount by violent pressure changes in line 32.

To avoid any effect upon the control system of the standardizing operation and in particular, the undesirable secondary effects such as extinguishment of the flame in furnaces followed by operation of the fuel valve towards fully open position, there is eliminated the rate action as a factor in the adjustment of the final control element, notwithstanding abrupt changes in the position of the slidewire 14. This is accomplished by including means for temporarily eliminating from the system the rate action produced by valve 57 as by providing an electrically operated bypass valve 65 which opens a flow channel 66 around valve 57 whenever the operating coil 67 of valve 65 is energized. That coil may be energized by closing switches 70a and 70b by any suitable means, either manually when a furnace door is opened, or by a link operated by such door, or upon operation of a knob 82 to change the control point, or they can be operated as the transfer switch 61 moves the disc 63 into engagement with disc 20. The energizing circuit for coil 67 may be traced from a supply line 71 by way of switch 70b, conductor 74, switch 75, coil 67, and by way of conductor 76 to the other supply line 77. The valve 65 not only immediately opens the bypass around valve 57, but it does so before any adjustment of slidewire 14 by disc 20. At the same time a circuit is completed by switch 70a for heater 72 which may be traced from line 71, switch 70a, heater 72, and by conductor 84 to the other line 77.

During the standardizing operation, heater 72 raises the temperature of the bimetallic strip 73 to close a holding circuit by way of contacts 78. This holding circuit maintains the coil 67 energized for a short interval of time after the opening of switches 70a and 70b. Rate action is eliminated for a time interval after the opening of the switches. Thus, rate action does not again become effective until bimetallic strip 73 cools to open contacts 78. At that time, stable operation of the control system as a whole will have been reestablished. The transfer means 61 may be manually or automatically operated. Standardizing can be fairly rapid, and after it is completed by transfer means is returned to the illustrated position opening the circuit through the heater 72. Nevertheless, valve 65 remains open until the bimetallic strip 73 cools to open the circuit through contacts 78. The time interval required for the opening of contacts 78 is adequate for the relay 19 to return the main slidewire 14 to network-balancing position, after which the contacts 78 open again to make effective the rate action provided by the inclusion of flow restriction 57.

While not in general as desirable as the provision of the valve 65, the switch 75 can be operated from its illustrated position to complete a circuit for the operating coil 79 of valve 80 included in line 32 to prevent change in pressure on diaphragm 10a just prior to standardization and to maintain valve 80 closed during and for a time interval after standardization to stabilize the operation and to eliminate rate action as a factor in the adjustment of valve 10 until after all effects of standardization have been removed from the control system.

Referring now to Fig. 2, the invention has been applied to a system embodying features of the inventions fully described in applications for Letters Patent, Serial Numbers 725,466 and 149,775, respectively filed on January 31, 1947 and March 15, 1950, now Patents Nos. 2,657,349 and 2,666,170 respectively, by co-employees of mine, Albert J. Williams, Jr., and Elwood T. Davis, and respectively patented October 27, 1953 as United States Letters Patent 2,657,349, and January 12, 1954 as United States Letters Patent 2,666,170. In a system like that shown in said Williams application, provision is made for periodic automatic standardization of a balanceable network 100 of the potentiometer type including a slidewire 101, resistors 102 and 103 in series therewith in one branch of the network, and resistors 104 and 105 in series in a second branch of the network. Current is supplied to the network from a battery 106 by way of a rheostat 107. Relative adjustment between slidewire 101 and its associated contact 101a is produced by a motor 108 energized from an amplifier 109 in response to unbalance signals appearing across the secondary of transformer 110. The primary winding of transformer 110 is connected to the stationary contacts of a vibrator or converter 111 driven by a solenoid 112 connected to alternating-current supply lines 113 which also form the source of supply for the amplifier 109. The input circuit to the converter and amplifier 109 includes a thermocouple 114, a transfer switch 115, and a filter network including resistors 116—118 and capacitors 119—121. Whenever the temperature to which the thermocouple 114 is subjected changes, the motor 108 is energized for rotation in a direction relatively to adjust contact 101a and slidewire 101 to balance the voltage derived by way of contact 101a and conductor 122 from potentiometer network 100 against that developed by the thermocouple 114. The capacitors 119—121, besides contributing to the filtering action above referred to, serve to introduce damping into the operation of the system, that is to say, to introduce into the measuring circuit a voltage component which varies in accordance with the speed of operation of the motor 108 in producing the relative movement between contact 101a and slidewire 101.

In order to avoid inaccuracy in the measurement of the temperature to which thermocouple 114 is subjected due to decay in the voltage of battery 106, the potentiometer circuit 100 is periodically standardized. Though the operation may be manual, as in Fig. 1, there has been disclosed in Fig. 2 use of a chart-driving motor 123 for driving a control cam 124 periodically and automatically to produce a standardizing operation.

The recorder 125 includes chart 126, a scale 127, a belt or "violin string" 128 driven by a pulley 129 which is in turn driven by motor 108 by way of a mechanical connection indicated by the broken line 130. When the cam 124 is rotated to bring a notch 124a beneath a cam follower 131a on a lever 131, the lever is rotated in a clockwise direction under the influence of a spring 132 to move a disc 133 into engagement with the periphery of the pulley 129. Upon any movement of pulley 129, disc 133 is driven relatively to adjust contact 107a and resistor 107 comprising the rheostat. Upon initial movement of lever 131 transfer switch 115 is operated from the illustrated position into engagement with the right-hand stationary contact connected to a standard cell 135 which has in circuit therewith a series resistor 136. The transfer switch 115 is operated through mechanical connections indicated by the broken line 137, a crank arm 138, and a mechanical connection 139. This connection also closes a switch 140a—140b immediately to complete an energizing circuit between supply lines 141 and 142 for a relay 143, and a heating coil 144. The first circuit may be traced from supply line 141 by way of switch 140a, conductor 145, and operating coil of relay 143 to the other supply line 142. The other circuit is directly through heating coil 144 of the bimetallic strip 152.

Upon operation of the transfer switch 115 there is a comparison between the voltage applied to the measuring circuit by the standardizing branch of the circuit and that developed across the standardizing resistor 105 in the potentiometer circuit 100. If there is a difference between the two voltages, the motor 108 is energized to adjust the rheostat 107 again to establish equality between them.

As in the operation described for Fig. 1, if the voltage of battery 106 has decreased, then upon operation of the transfer switch 115 there is applied to the measuring circuit and to amplifier 109, as a step function, the full difference between the voltage derived from the standard cell 135 and that developed across standardizing resistor 105. The result of the application of a step function of voltage to the amplifier 109 will be the energization of the motor 108 for operation at high speed to adjust the rheostat 107. At the same time, however, it will be observed that there is relative adjustment between slidewire 101 and its contact 101a and that there is likewise simultaneous high-speed relative adjustment as between contact 150a and its associated slidewire 150.

If the control system of which the slidewire 150 forms a part has rate action, as it has, the high-speed adjustment of slidewire contact 150a will cause large temporary changes in the position of valve 10. This is avoided, however, through the completion of an energizing circuit by switch 140a for the relay 143, traced by way of conductor 145. That circuit is not only completed just prior to initiation of the standardizing operation by motor 108, but by reason of the heating coil 144 and the closure of contacts 151 by a bimetallic strip 152, the relay 143 is energized for a time interval after the switch 140a—140b has again moved to its open position and after the standardizing operation has been completed. The holding circuit for relay 143 is maintained closed until the contacts 151 are opened by the cooling of the bimetallic strip.

The manner in which the relay 143 eliminates rate action as a factor in the adjustment of the final control element, again illustrated as valve 10, will be explained after a brief resume of the operation of the electrical control system which electrically performs the several functions already discussed in connection with the pneumatic system of Fig. 1.

The slidewire 150 is connected in a bridge type of network 154 provided with a battery 155, and a series resistor 156. There are three branches to the network, one including the slidewire 150, a second including the slidewire 157, and a third including another slidewire 158. Adjustment of the slidewire 157 regulates the current flowing to the other two branches of the network, and in manner later to be explained, provides adjustment of the throttling range or proportional band for the control system. The slidewire 158 provides a convenient means to select the desired control point. From the bridge network 154 there is derived as between conductors 159 and 160 a voltage $E_1$ which in the input circuit to an amplifier 161 is in opposition to a voltage $E_3$ developed between conductor 159 and the other input conductor 162 of amplifier 161. Voltages applied by the amplifier 161 energize a motor control 163 for energization of a motor 164 for rotation in a forward or reverse direction to adjust the position of the valve 10.

The control system represented by the amplifier 161 and the motor control 163 can be of the type disclosed in Williams Patent No. 2,367,746.

The voltage $E_3$ developed between conductors 159 and 162 is derived from a bridge circuit 165 including a battery 166, a series resistor 167 supplying current to a slidewire 168 relatively adjustable with respect to its associated contact 168a by the motor 164 as by a mechanical connection indicated by the broken line 169. It will be observed the conductor 159 is connected at the point 170 between contact 168a and an adjustable resistor or slidewire 171 which is included in series with a resistor 172. A conductor 173 is connected to the point 174 between resistor 172 and a capacitor 175, the conductor 173 leading to a resistor or slidewire 176 connected in series with one side of the input circuit of the amplifier 161 now in series with conductor 162. If the capacitor 175, for purposes of description only, be considered as conductively bypassed or short-circuited, it will be seen that there will be developed between conductors 159 and 173 a voltage $E_2$. The resistors 177 and 178 form a branch of the network in parallel with the battery 166 and resistor 167, a further branch of the circuit extending to the juncture or point 179 between resistors 177 and 178. Resistors 177 and 178 predetermine the potential of the point 179.

Also neglecting for the moment the branch circuit including a slidewire 180, a series resistor 181 and a capacitor 182, it will be seen that there is provided proportional control action for the adjustment of valve 10. More particularly, for a given adjustment of contact 150a of control slidewire 150, there will be a corresponding follow-up adjustment by the motor 164 driving valve 10 and the slidewire contact 168a to make the value of voltage $E_2$ equal and opposite to the voltage $E_1$. Mathematically, for a given change in the controlled variable $\theta$ (the temperature of thermocouple 114), the adjustment of slidewire contact 168a and valve 10 will be equal to $K_1\theta$, where $K_1$ is a constant. The throttling range or the proportional band may be changed by adjustment of slidewire 157. It may be further observed that if the temperature of thermocouple 114 is increasing, the voltage $E_1$ will be changed in one direction, while if the temperature is decreasing, $E_1$ will be changed in the opposite direction. Thus, the difference voltage may be of one polarity or the other as applied to the amplifier to produce rotation of the motor 164 in the direction to change the setting of valve 10 in the direction to oppose the change of the controlled variable (temperature).

The amplifier 161 is provided with high gain and it preferably has a high-impedance input circuit. Because of its high gain the contact 168a will be driven and will continue to be moved by motor 164 to maintain voltage $E_2$ equal and opposite to voltage $E_1$ upon any change thereof. If voltage $E_1$ rapidly changes, motor 164 will operate at high speed.

There will now be considered the effect of the provision of capacitor 175 and of the resistance in circuit therewith provided by slidewire 171 and series resistor 172. The voltage $E_2$ is that which appears across resistors 171 and 172. When $E_2$ is equal to $E_1$ obviously a constant current will be flowing through resistors 171 and 172. Since the impedance of amplifier 161 is high, it may be assumed that all of the current flowing through said resistors will flow by way of capacitor 175. Accordingly, the capacitor 175 gradually accumulates a charge, and the potential across it rises. That rise in voltage requires an increase in the potential between contact 168a and the juncture point 179 in order to maintain the required value of current flow through resistors 171 and 172 to balance the voltage $E_1$. As a result of the foregoing, the motor 164 will be progressively energized to move the contact 168a to meet the foregoing conditions. The motor 164 will continue to be energized so long as there is deviation in the value of the controlled variable from its desired value.

Mathematically, the action of capacitor 175 is to provide automatic reset or droop corrector action expressed as a correction of magnitude corresponding with the summation with respect to time of the deviation of the controlled variable from a predetermined value. In symbols, automatic reset action is equal to $$K_2 \int \theta dt$$

where $K_2$ is a constant, and $dt$ is the time differential increment.

Rate action, that is, an adjustment of the valve 10 by motor 164 in accordance with the rate of change of voltage $E_1$, or of temperature of thermocouple 114, is provided by slidewire 176 and the branch circuit including capacitor 182. The resistor 176 in series in the input circuit to the amplifier 161 attenuates the input signal. The voltage needed to balance $E_1$ will be the voltage $E_3$ appearing between conductors 159 and 162, the voltage across the branch of the network including capacitor 182. In order that $E_3$ shall be equal to $E_1$, the voltage across resistors 171 and 172 must be made greater by an amount equal to the voltage attenuation. The voltage attenuation due to resistor 176 is of magnitude determined by the charging current of capacitor 182 flowing through resistor 176. It will be understood that the attenuation introduced by resistor 176 will be greater with greater rates of change in voltage $E_2$ due to the charging characteristics of a capacitor. Mathematically, the rate action may be expressed by saying that the motor 164 will be operated at increased speeds related to the rate of change of voltage of $E_1$, or, symbolically, there will be a component equal to $$K_3 \frac{d\theta}{dt}$$

where $K_3$ is a constant. The magnitude of the rate action may be varied by rotation of a knob 183 for simultaneous adjustment of slidewires 176 and 180. Slidewire 180 provides a damping action in the circuit as explained in copending application Serial No. 149,775 filed March 15, 1950, Patent No. 2,666,170. The resistor 181 is provided to insure that the circuit including capacitor 182 will always have a minimum resistance, notwithstanding the setting of slidewires 176 and 180. The knob 183 may be rotated to include or exclude all of the resistance of slide-wires 176 and 180.

The components of control action already referred to may now be expressed in terms of an equation:

$$-V = K_1\theta + K_2\int \theta\, dt + K_3\frac{d\theta}{dt}$$

where $\theta$ is the deviation of the variable characteristic from the control point, $-V$ is the adjustment of the valve or compensating effect in direction to return $\theta$ to the control point, $t$ is time, and $K_1$, $K_2$ and $K_3$ are constants.

In accordance with the present invention, the third term of the equation is eliminated as a material component affecting the adjustment of the valve or compensating effect during spurious inserted disturbances such as standardizing operations. In Fig. 2 this is accomplished by the relay 143 which, when energized as already described, closes its contacts to complete a bypass circuit around the slidewire 176 thus to eliminate from the input circuit of the amplifier the previously described attenuation of the voltage E2. In some instances it may be desirable to simultaneously provide a bypass circuit around slidewire 180. Thus, during standardization, the rate action would appear to the control system to be $$K_3\frac{dE_1}{dt}$$

but since its effect has been eliminated the position of the valve 10 will not during standardization be affected by rate action.

Now that the principles of the invention have been fully explained in connection with two control systems of widely differing character, it is to be understood that further modifications may be made of the type already referred to, certain features used without other features, and that the invention can be applied to many forms of control systems, all within the scope of the appended claims.

What is claimed is:

1. In a controller for adjusting the position of a final control element for maintaining substantially constant a controlled variable including a balanceable system having an element for unbalancing the system in accordance with change in the magnitude of said controlled variable, the combination of flow-resistance means for introducing into the adjustment of the final control element a component of rate action of magnitude related to the rate of change of the magnitude of said controlled variable, means operable from a first position to a second position for greatly reducing the impedance of said flow-resistance means to eliminate said rate action as a factor in the adjustment of the final control element after actuation to said second position and for reestablishing said rate action after return to its first position.

2. The combination set forth in claim 1 in which said flow-resistance means comprises an electric resistor and in which said means for reducing the impedance of said flow-resistance means is a shunting circuit for said resistor.

3. The combination set forth in claim 1 in which said flow-resistance means is a restriction providing impedance to fluid flow and in which said means for reducing the impedance is a low-impedance flow path in shunt with said restriction for flow of fluid therearound.

4. The combination set forth in claim 1 in which there is provided time-delay means for maintaining operation of said means to reduce the impedance of said flow-resistance means for a time interval after return of said means from its second to its first position.

5. The combination set forth in claim 1 in which said flow-resistance means comprises an electric resistor and in which said means for reducing said impedance of said flow-resistance means is a shunting circuit for said resistor, and time-delay means for maintaining said shunting circuit closed for a time interval after return of said means from its second position to its first position.

6. The combination set forth in claim 1 in which said flow-resistance means is a restriction providing impedance to fluid flow and in which said means for reducing the impedance is a low-impedance flow path in shunt with said restriction for flow of fluid therearound, and time-delay means for maintaining effective said low-impedance flow path in shunt with said restriction for a time interval after return of said means from its second to its first position.

7. A control system for maintaining substantially constant a controlled variable, comprising a balanceable network unbalanced with change in magnitude of said controlled variable, a detector, a first adjustable element operable under the control of said detector to balance said network, a standardizing circuit, transfer means for connecting said detector to said standardizing circuit, said control system including a balanceable system unbalanced by operation of said first element in balancing said network, said balanceable system including flow-resistance means for introducing into the control of said variable a component of rate action of magnitude related to the rate of change of the magnitude of said controlled variable, a second adjustable element electrically connected to said network for standardizing the same, means operable when said transfer means connects said standardizing circuit to said detector for greatly reducing the impedance of said flow-resistance means to eliminate said rate action as a factor in said control of said variable during standardizing.

References Cited in the file of this patent

UNITED STATES PATENTS

| Number | Name | Date |
|---|---|---|
| 2,424,146 | Caldwell et al. | July 15, 1947 |
| 2,489,999 | Cherry | Nov. 29, 1949 |
| 2,501,583 | Schafer | Mar. 21, 1950 |
| 2,507,606 | McLeod | May 16, 1950 |
| 2,543,120 | McLeod | Feb. 27, 1951 |
| 2,583,339 | Mouzon | Jan. 22, 1952 |
| 2,625,911 | Schmitt | Jan. 20, 1953 |